US012694829B2

(12) United States Patent
Chen

(10) Patent No.: US 12,694,829 B2
(45) **Date of Patent: *Jul. 28, 2026**

(54) DISPLAY CONTROL METHOD OF DISPLAY PANEL, DISPLAY MODULE, AND DISPLAY DEVICE

(71) Applicant: Wuhan China Star Optoelectronics Semiconductor Display Technology Co., Ltd., Wuhan (CN)

(72) Inventor: Tao Chen, Wuhan (CN)

(73) Assignee: Wuhan China Star Optoelectronics Semiconductor Display Technology Co., Ltd., Wuhan (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/921,133

(22) Filed: Oct. 21, 2024

(65) Prior Publication Data

US 2025/0046251 A1 Feb. 6, 2025

Related U.S. Application Data

(63) Continuation of application No. 17/789,229, filed as application No. PCT/CN2022/095176 on May 26, 2022, now Pat. No. 12,154,501.

(30) Foreign Application Priority Data

May 13, 2022 (CN) ......................... 202210521920.2

(51) Int. Cl.
*G09G 3/3233* (2016.01)
*G09G 3/32* (2016.01)
*G09G 3/3266* (2016.01)

(52) U.S. Cl.
CPC ............ *G09G 3/3233* (2013.01); *G09G 3/32* (2013.01); *G09G 3/3266* (2013.01); (Continued)

(58) Field of Classification Search
None
See application file for complete search history.

(56) References Cited

U.S. PATENT DOCUMENTS 12,154,501 B2 * 11/2024 Chen ........................ G09G 3/32
2016/0063922 A1 3/2016 Tsai et al.

(Continued)

FOREIGN PATENT DOCUMENTS

CN 102760406 10/2012
CN 104282269 1/2015

(Continued)

OTHER PUBLICATIONS

International Search Report and the Written Opinion Dated Jan. 6, 2023 From the International Searching Authority Re. Application No. PCT/CN2022/095176 and Its Translation Into English. (19 Pages).

(Continued)

*Primary Examiner* — Dorothy Harris

(57) ABSTRACT

The present invention provides a display control method of a display panel, a display module, and a display device. Pulse widths of first pulses corresponding to non-display phases in one frame period in an emission start signal are at least partially different, so that pixel driving circuits adjust light-emitting durations of light-emitting devices corresponding to each display phase according to emission control signals. Accordingly, a display brightness of each light-emitting device can be adjusted within one frame period, and a flickering problem can be alleviated.

17 Claims, 6 Drawing Sheets

(52) U.S. Cl.
CPC ............... *G09G 2300/0819* (2013.01); *G09G 2300/0842* (2013.01); *G09G 2300/0861* (2013.01); *G09G 2310/0267* (2013.01); *G09G 2310/08* (2013.01); *G09G 2320/0233* (2013.01); *G09G 2320/0247* (2013.01); *G09G 2320/041* (2013.01); *G09G 2320/0626* (2013.01); *G09G 2370/00* (2013.01)

(56) References Cited

U.S. PATENT DOCUMENTS

| | | | | |
|---|---|---|---|---|
| 2019/0355304 | A1* | 11/2019 | Tanaka | G01K 7/22 |
| 2020/0082768 | A1* | 3/2020 | Oh | G09G 3/3291 |
| 2022/0059014 | A1* | 2/2022 | Kuo | G09G 3/32 |
| 2023/0117873 | A1* | 4/2023 | Kim | G09G 3/32 345/55 |

FOREIGN PATENT DOCUMENTS

| | | |
|---|---|---|
| CN | 106486053 | 3/2017 |
| CN | 109036287 | 12/2018 |
| CN | 109427293 | 3/2019 |
| CN | 111833790 | 10/2020 |
| CN | 113012634 | 6/2021 |
| CN | 113380193 | 9/2021 |
| CN | 113870783 | 12/2021 |
| CN | 114023267 | 2/2022 |
| JP | 2014-089279 | 5/2014 |

OTHER PUBLICATIONS

Notification of Decision of Rejection Dated Aug. 8, 2023 From the State Intellectual Property Office of the People's Republic of China Re. Application No. 202210521920.2 and Its Translation Into English. (19 Pages).

Notification of Office Action and Search Report Dated Mar. 6, 2023 From the State Intellectual Property Office of the People's Republic of China Re. Application No. 202210521920.2 and Its Translation Into English. (24 Pages).

Notification of Office Action Dated Jun. 2, 2023 From the State Intellectual Property Office of the People's Republic of China Re. Application No. 202210521920.2 and Its Translation Into English. (19 Pages).

* cited by examiner

DISPLAY CONTROL METHOD OF DISPLAY PANEL, DISPLAY MODULE, AND DISPLAY DEVICE

FIELD OF DISCLOSURE

The present application relates to a field of display technology and in particular, to a display control method of a display panel, a display module, and a display device.

DESCRIPTION OF RELATED ART

Using a low refresh frequency to realize display control of the display panel can reduce power consumption of the display panel. However, due to a current leakage problem of transistors, display brightness fluctuates in a frame period when display is performed at low refresh frequencies, causing a flickering problem which can be observed by the human eyes and affects user experiences.

The present application provides a display control method of a display panel, a display module, and a display device, which can alleviate a flickering problem that occurs when the display panel displays images with low refresh frequencies.

SUMMARY OF THE INVENTION

The present application provides a display control method of a display panel, wherein the display panel includes a driving chip, a plurality of light-emitting devices, a plurality of pixel driving circuits, and a plurality of cascaded emission control driving circuits; the driving chip is electrically connected to a processing chip of a display device and to the cascaded emission control driving circuits; and the cascaded emission control driving circuits output a plurality of emission control signals according to an emission start signal, so that the pixel driving circuits control the light-emitting devices to emit light.

The display control method of the display panel includes:

the driving chip transmitting a compensated emission start signal to the emission control driving circuits, wherein the compensated emission start signal is obtained by compensating pulse widths of multiple first pulses corresponding to multiple non-display phases in one frame period in the initial emission start signal according to multiple pulse width compensation values.

Optionally, in some embodiments of the present application, the pulse width compensation values are at least partially unequal.

Optionally, in some embodiments of the present application, the pulse widths of the first pulses corresponding to the non-display phases in one frame period in the compensated emission start signal are at least partially different.

Optionally, in some embodiments of the present application, each of the first pulses corresponding to the non-display phases in one frame period in the initial emission start signal has a first initial pulse width;

each of the first pulses corresponding to the non-display phases in one frame period in the compensated emission start signal has a second pulse width; and the second pulse width is equal to a difference between the first initial pulse width and a corresponding one of the pulse width compensation values.

Optionally, in some embodiments of the present application, before the step of the driving chip transmitting the compensated emission start signal to the emission control driving circuit, the display control method further includes:

the driving chip receiving a brightness adjustment instruction, wherein the brightness adjustment instruction is generated by the processing chip according to a brightness adjustment interval corresponding to a brightness of the display panel corresponding to the initial emission start signal or is generated by the processing chip according to an operating temperature of the display panel;

the driving chip obtaining the pulse width compensation values according to the brightness adjustment instruction; and the driving chip compensating the initial emission start signal according to the pulse width compensation values.

Optionally, in some embodiments of the present application, before the step of the driving chip transmitting the compensated emission start signal to the emission control driving circuit, the display control method further includes:

the driving chip receiving the pulse width compensation values, wherein the pulse width compensation values are obtained by the processing chip according to a brightness adjustment interval corresponding to a brightness of the display panel corresponding to the initial emission start signal or obtained by the processing chip according to an operating temperature of the display panel.

Optionally, in some embodiments of the present application, the brightness of the display panel corresponding to the brightness adjustment interval is proportional to a sum of the pulse width compensation values.

Optionally, in some embodiments of the present application, the operating temperature is proportional to a sum of the pulse width compensation values.

The present application further provides a display module, including a display panel, wherein the display panel includes:

a plurality of light-emitting devices;

a plurality of cascaded emission control driving circuits for outputting a plurality of emission control signals according to an emission start signal;

a plurality of pixel driving circuits electrically connected to the light-emitting devices and the emission control driving circuits, wherein the pixel driving circuits control the light-emitting devices to emit light according to the emission control signals; and a driving chip electrically connected to a processing chip of a display device and to the emission control driving circuits, wherein the driving chip transmits the emission start signal to the emission control driving circuits;

wherein pulse widths of multiple first pulses corresponding to multiple non-display phases in one frame period in the emission start signal are at least partially different.

Optionally, in some embodiments of the present application, the emission start signal is obtained by compensating the pulse widths of the multiple first pulses corresponding to the multiple non-display phases in one frame period in an initial emission start signal according to multiple pulse width compensation values;

wherein the pulse width compensation values are at least partially unequal.

Optionally, in some embodiments of the present application, each of the multiple first pulses corresponding to the non-display phases in one frame period in the initial emission start signal has a first initial pulse width;

each of the first pulses corresponding to the non-display phases in one frame period in the emission start signal has a second pulse width; and wherein the second pulse width is equal to a difference between the first initial pulse width and a corresponding one of the pulse width compensation values.

Optionally, in some embodiments of the present application, each of the first initial pulse widths is greater than the corresponding second pulse width.

Optionally, in some embodiments of the present application, in one frame period, the display panel has a first brightness corresponding to a first brightness adjustment interval corresponding to the initial emission start signal, and the emission start signal is obtained by compensating the pulse widths of the first pulses corresponding to the non-display phases in one frame period according to multiple first pulse width compensation values; and in another frame period, the display panel has a second brightness corresponding to a second brightness adjustment interval corresponding to the initial emission start signal, and the emission start signal is obtained by compensating the pulse widths of the first pulses corresponding to the non-display phases in one frame period according to multiple second pulse width compensation values;

wherein the first brightness is greater than the second brightness, and a sum of the multiple first pulse width compensation values is greater than a sum of the multiple second pulse width compensation values.

Optionally, in some embodiments of the present application, in one frame period, the display panel has a first operating temperature, and the emission start signal is obtained by compensating the pulse widths of the first pulses corresponding to the non-display phases in one frame period in the initial emission start signal according to multiple third pulse width compensation values; and in another frame period, the display panel has a second operating temperature, and the emission start signal is obtained by compensating the pulse widths of the first pulses corresponding to the non-display phases in one frame period in the initial emission start signal according to multiple fourth pulse width compensation values;

wherein the first operating temperature is greater than the second operating temperature, and a sum of the third pulse width compensation values is greater than a sum of the fourth pulse width compensation values.

Each of the pixel driving circuits includes a first transistor, a fifth transistor, and a sixth transistor. A source and a drain of the first transistor, a source and a drain of the fifth transistor, a source and a drain of the sixth transistor, and the corresponding light-emitting device are connected in series between a first voltage terminal and a second voltage terminal.

The cascaded emission control driving circuits are electrically connected to gates of the fifth transistors and gates of the sixth transistors in the pixel driving circuits, and the gate of the fifth transistor and the gate of the sixth transistor in the same pixel driving circuit are electrically connected to the same emission control driving circuit.

The present application further provides a display device, including the display module and the processing chip mentioned above, wherein the processing chip is electrically connected to the driving chip.

Advantages of the Present Application

Compared with conventional techniques, the present application provides a display control method for a display panel, a display module, and a display device. A driving chip is used to transmit an emission start signal to multiple cascaded emission control driving circuits, so that the cascaded emission control driving circuits sequentially output a plurality of emission control signals, and thereby pixel driving circuits control light-emitting devices according to the emission control signals to realize display operations of the display panel. Compared with the initial emission start signal, pulse widths of first pulses corresponding to non-display phases in one frame period in the emission start signal transmitted by the driving chip to the emission control driving circuit are at least partially different. Therefore, pulse widths of pulses, which are corresponding to the non-display phases and are in the emission control signals output by the cascaded emission control driving circuits are also at least partially different. When the pixel driving circuits control the light-emitting devices to realize display operations according to the emission control signals, a display duration of each display phase is adjusted, so that the display brightness of each light-emitting device can be adjusted in one frame period, thus improving a flickering problem.

DESCRIPTION OF SPECIFIC EMBODIMENTS OF THE INVENTION

In order to make the objectives, technical solutions, and effects of the present application clearer and more definite, the present application is further described in detail below with reference to the accompanying drawings and specific embodiments. It should be understood that the specific embodiments described herein are only used to explain the present application, but not to limit the present application.

Figure 1:
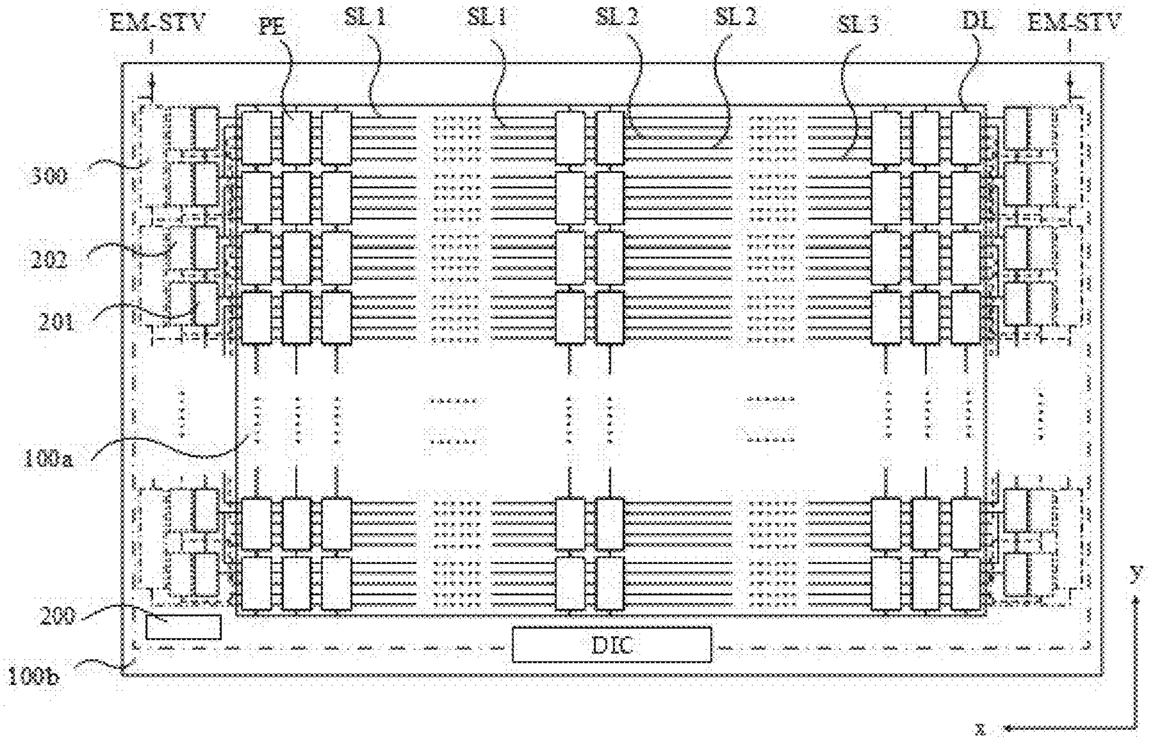
FIG. 1 is a schematic structural view illustrating a display panel according to one embodiment of the present application.

Specifically, FIG. 1 is a schematic structural view of a display panel according to one embodiment of the present application. The present application provides a display panel. The display panel includes a plurality of data lines DL, a plurality of gate lines, a plurality of light-emitting devices PE, a plurality of gate driving circuits, a plurality of emission control driving circuits 300 connected in cascade, a plurality of pixel driving circuits, and a driving chip DIC.

The data lines DL transmit a plurality of data signals. Optionally, the data lines DL are arranged along a first direction x, each of the data lines DL extends along a second direction y, and the first direction x and the second direction y intersect.

The multiple gate lines include multiple first gate lines SL1, multiple second gate lines SL2, and multiple third gate lines SL3. The first gate lines SL1 transmit a plurality of first gate signals, a plurality of second gate lines SL2 transmit a plurality of second gate signals, and a plurality of third gate lines SL3 transmit a plurality of emission control signals EM. Optionally, the gate lines are arranged along the second direction y, and each of the gate lines extends along the first direction x.

The light-emitting devices PE are located in a display area 100*a* of the display panel. The light-emitting devices PE are electrically connected to the pixel driving circuits. The display area 100*a* is used to realize a display function. Optionally, the light-emitting devices PE include organic light-emitting diodes, sub-millimeter light-emitting diodes, or micro light-emitting diodes.

The gate driving circuits include multiple cascaded first gate driving circuits 201 and multiple cascaded second gate driving circuits 202. The multiple cascaded first gate driving circuits 201 are electrically connected to a plurality of pixel driving circuits through multiple first gate line SL1. The cascaded first gate driving circuits 201 output a plurality of first gate signals Scan1 according to a first start signal. The multiple cascaded second gate driving circuits 202 are electrically connected to the pixel driving circuits through the second gate lines SL2. The multiple cascaded second gate driving circuits 202 output multiple second gate signals Scan2 according to a second start signal. Optionally, the cascaded emission control driving circuits 300 are located in a non-display area 100*b* of the display panel. The non-display area 100*b* can be located at a periphery of the display area 100*a*.

The cascaded emission control driving circuits 300 output a plurality of emission control signals EM according to an emission start signal EM-STV. The cascaded emission control driving circuits 300 are electrically connected to the pixel driving circuits through the third gate lines SL3. Optionally, the cascaded emission control driving circuits 300 are located in the non-display area 100*b* of the display panel.

Optionally, each of the emission control driving circuits 300 can operate in a one-driving-two manner. That is to say, each of the emission control driving circuits 300 is electrically connected to the pixel driving circuits electrically connected to the light-emitting devices PE located in two rows adjacent to the emission control driving circuit 300. Accordingly, the cascaded emission control driving circuits 300 are located on one side of the cascaded first gate driving circuits 201 and/or the second gate driving circuits 202 away from the display area 100*a*.

The pixel driving circuits are electrically connected the light-emitting devices PE, the cascaded first gate driving circuits 201, the cascaded second gate driving circuits 202, and the cascaded emission control driving circuits 300. The pixel driving circuits are used to control the light-emitting devices PE to realize display functions of the display panel according to the first gate signals Scan1, the second gate signals Scan2, and the emission control signals EM.

Figure 2A:
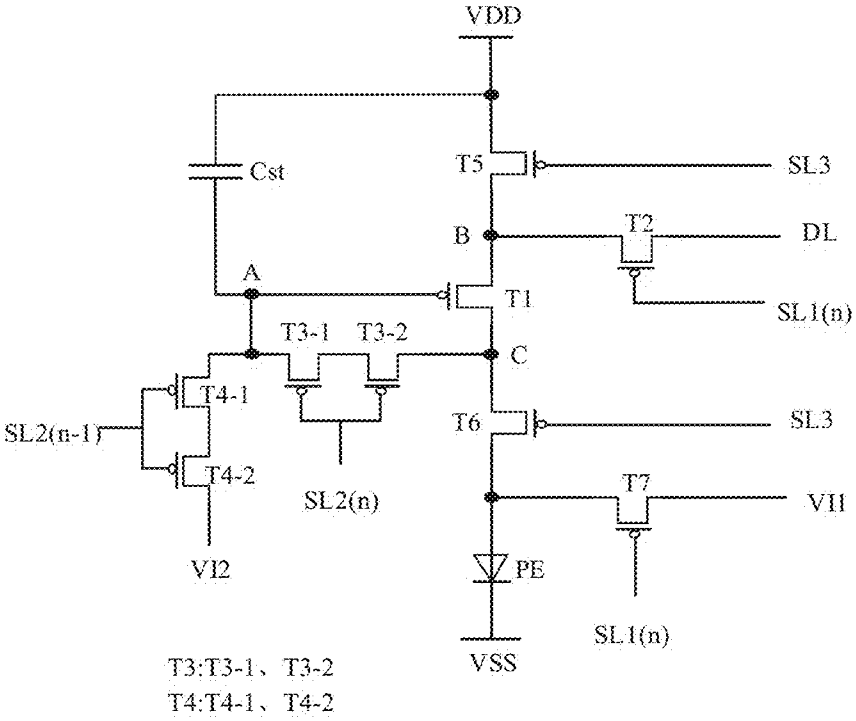
FIG. 2A is a schematic structural diagram illustrating a pixel driving circuit according to one embodiment of the present application.
Figure 2B:
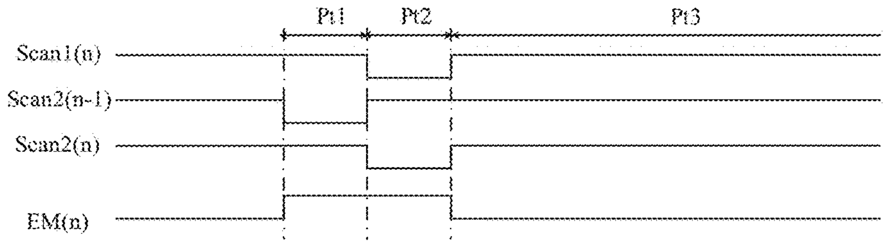
FIG. 2B is a timing diagram corresponding to the pixel driving circuit shown in FIG. 2A, according to one embodiment of the present application.

Please refer to FIG. 2A, which is a schematic structural diagram of a pixel driving circuit according to one embodiment of the present application. FIG. 2B is a timing diagram corresponding to the pixel driving circuit shown in FIG. 2A according to one embodiment of the present application. Each of the pixel driving circuits includes a first transistor T1, a second transistor T2, a third transistor T3, a fourth transistor T4, a fifth transistor T5, a sixth transistor T6, a seventh transistor T7, and a storage capacitor Cst.

Specifically, a gate of the first transistor T1 is electrically connected to a first node A, one of a source or a drain of the first transistor T1 is electrically connected to a second node B, and the other one of the source or the drain of the first transistor T1 is electrically connected to a third node C. The source and drain of the first transistor T1 and the light-emitting device PE are connected in series between a first voltage terminal VDD and a second voltage terminal VSS.

Optionally, an anode of the light-emitting device PE is electrically connected to a third node C, and a cathode of the light-emitting device PE is electrically connected to the second voltage terminal VSS; or alternatively, the anode of the light-emitting device PE is electrically connected to the first voltage terminal VDD, and the cathode of the light-emitting device PE is electrically connected to the second node B.

It can be understood that each of the pixel driving circuits is electrically connected to at least one of the light-emitting devices PE. When one of the pixel driving circuits is electrically connected to multiple light-emitting devices PE, the light-emitting devices PE can be connected in series and/or in parallel.

A source and a drain of the second transistor T2 are connected in series between a corresponding data line DL and the second node B, and a gate of the second transistor T2 is electrically connected to the corresponding gate line. Optionally, the gates of the second transistors T2 in the pixel driving circuits that are electrically connected to the light-emitting devices PE located in the same row are connected to the same first gate line SL1. For example, the gates of the second transistors T2, which are in the pixel driving circuits and electrically connected to the light-emitting devices PE in the n-th row, are all connected to the n-th first gate line SL1(*n*) which transmits the n-th stage first gate signal Scan1(*n*). Wherein, n is greater than 0, and n is an integer. The n-th stage first gate driving circuit outputs the n-th stage first gate signal Scan1(*n*).

A source and a drain of the third transistor T3 are connected in series between the first node A and the third node C. A gate of the third transistor T3 is electrically connected to the corresponding gate line. Optionally, the gates of the third transistors T3, which are in the pixel driving circuits and electrically connected to the light-emitting devices PE located in the same row, are connected to the same second gate line SL2. For example, the gates of the third transistors T3, which are in the pixel driving circuits and electrically connected to the light-emitting devices PE in the n-th row, are all electrically connected to the n-th second gate line SL2(*n*) which transmits the n-th stage second gate signal Scan2(*n*). Optionally, the third transistor T3 is a dual-gate transistor. That is to say, the third transistor T3 includes a transistor T3-1 and a transistor T3-2, so as to reduce an influence of a potential at the third node C on a potential at the first node A when the light-emitting device PE emits light.

A source and a drain of the fourth transistor T4 are electrically connected between a second reset line VI2 and the first node A, and a gate of the fourth transistor T4 is electrically connected to the corresponding second gate driving circuit. In order to ensure time-divisional conduction of the third transistor T3 and the fourth transistor T4, the gates of the third transistor T3 and the fourth transistor T4 are electrically connected to the second gate line SL2 that transmits the second gate signal Scan2 of different stage. For example, the gates of the fourth transistors T4 in the pixel driving circuits electrically connected to the light-emitting devices PE in the n-th row are electrically connected to the second gate line SL2(*n*−1) that transmits the (n−1)-th stage second gate signal Scan2(*n*−1). Wherein, the (n−1)-th stage second gate driving circuit outputs the (n−1)-th stage second gate signal Scan2(*n*−1). Optionally, the fourth transistor T4 is a dual-gate transistor, that is, the fourth transistor T4 includes a transistor T4-1 and a transistor T4-2, so as to reduce an influence of the second reset line VI2 on a potential at the first node A when the light-emitting device PE emits light.

A source and a drain of the fifth transistor T5 are electrically connected between the first voltage terminal VDD and the second node B, and a source and a drain of the sixth transistor T6 are electrically connected between the third node C and the second voltage terminal VSS. A gate of the fifth transistor T5 and a gate of the sixth transistor T6 are electrically connected to the corresponding emission control driving circuit 300 through the third gate line SL3. The gate of the fifth transistor T5 and the gate of the sixth transistor T6 in the same pixel driving circuit are electrically connected to the same emission control driving circuit 300.

A source and a drain of the seventh transistor T7 are electrically connected between the first reset line VI1 and the light-emitting device PE. Gates of the seventh transistors T7 in the pixel driving circuits are electrically connected to the cascaded first gate driving circuits. Optionally, the gates of the seventh transistors T7, which are in the pixel driving circuits and electrically connected to the light-emitting devices PE located in the n-th row, are all electrically connected to the first gate line SL1(*n*) that transmits the n-th stage first gate signal Scan1(*n*), or to the first gate line SL1(*n*+1) that transmits the (n+1)-th stage first gate signal Scan1(*n*+1), or to the first gate line SL1(*n*−1) that transmits the (n−1)-th stage first gate signal Scan1(*n*−1). The (n+1)-th stage first gate driving circuit outputs the (n+1)-th stage first gate signal Scan1(*n*+1), and the (n−1)-th stage first gate driving circuit outputs the (n−1)-th stage first gate signal Scan1(*n*−1).

The storage capacitor Cst is connected in series between the first node A and the first voltage terminal VDD.

Optionally, active layers of the first transistor T1 to the seventh transistor T7 include silicon semiconductor or oxide semiconductor. Further, the active layers of the first transistor T1 to the seventh transistor T7 all include low temperature polysilicon semiconductors.

FIG. 2B is a timing diagram corresponding to the pixel driving circuit shown in FIG. 2A, according to one embodiment of the present application, which takes as an example that the first transistor T1 to the seventh transistor T7 are all P-type transistors.

In an initialization phase Pt1: The fourth transistor T4 is turned on in response to the (n−1)-th stage second gate signal Scan2(*n*−1) transmitted by the (n−1)-th stage second gate line SL2(*n*−1). A second reset signal transmitted by the second reset line VI2 is transmitted to the gate of the first transistor T1 to initialize a gate voltage of the first transistor T1.

In a data writing and compensation phase Pt2: The second transistor T2 and the seventh transistor T7 are turned on in response to the n-th first gate signal Scan1(*n*) transmitted by the n-th stage first gate line SL1(*n*). The third transistor T3 is turned on in response to the n-th stage second gate signal Scan2(*n*) transmitted by the n-th stage second gate line SL2(*n*). The data signal transmitted by the data line DL for compensating a threshold voltage of the first transistor T1 is transmitted to the gate of the first transistor T1 through the second transistor T2, the first transistor T1, and the third transistor T3. The first capacitor C1 charges and maintains the gate voltage of the first transistor T1. The seventh transistor T7 transmits the first reset signal transmitted by the first reset line VI1 to the anode of the light-emitting device D, so as to initialize an anode voltage of the light-emitting device D.

In the light-emitting phase Pt3: The fifth transistor T5 and the sixth transistor T6 are turned on in response to the n-th stage emission control signal EM(n) transmitted by the corresponding third gate line SL3. The first transistor T1 generates a driving current for driving the light-emitting device DI to emit light.

Figure 3A:
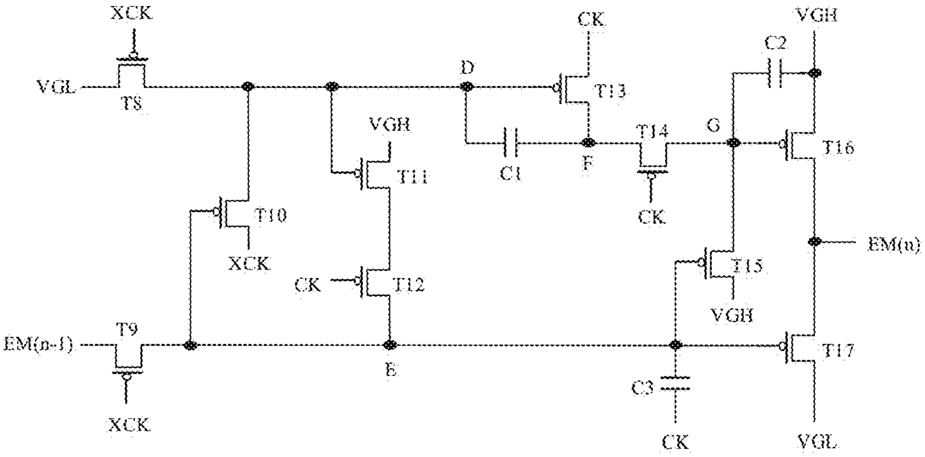
FIG. 3A is a schematic structural diagram illustrating an emission control driving circuit according to one embodiment of the present application.
Figure 3B:
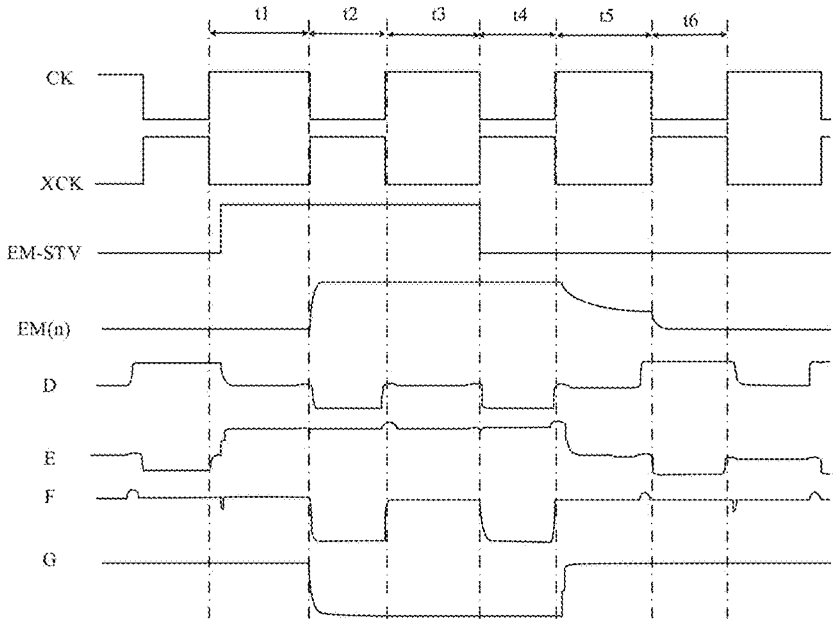
FIG. 3B is a timing diagram corresponding to the emission control driving circuit shown in FIG. 3A, according to one embodiment of the present application.

FIG. 3A is a schematic diagram of the emission control driving circuit according to one embodiment of the present application. FIG. 3B is a timing diagram corresponding to the emission control driving circuit shown in FIG. 3A, according to one embodiment of the present application. Each of the emission control driving circuits includes an eighth transistor T8, a ninth transistor T9, a tenth transistor T10, an eleventh transistor T11, a twelfth transistor T12, a thirteenth transistor T13, a fourteenth transistor T14, a fifteenth transistor T15, a sixteenth transistor T16, a seventeenth transistor T17, a first capacitor C1, a second capacitor C2, and a third capacitor C3.

A source and a drain of the eighth transistor T8 are electrically connected between a first power line VGL and a fourth node D, and a gate of the eighth transistor T8 is electrically connected to a first clock line XCK. Optionally, a voltage transmitted by the first power line VGL is in a range from −7V to −9V.

A source and a drain of the ninth transistor T9 are electrically connected between an output end of the emission control driving circuit of the previous stage and a fifth node E. A gate of the ninth transistor T9 is electrically connected to the first clock line XCK. The source and drain of the ninth transistor T9 of the first emission control driving circuit in the multiple cascaded emission control driving circuits 300 are electrically connected between the emission start signal line and the fifth node E. The source and the drain of the ninth transistor T9 of the n-th stage emission control driving circuit are electrically connected between the output end of the (n−1)-th stage emission control driving circuit and the fifth node E. The emission start signal line transmits the emission start signal EM-STV, and the (n−1)-th stage emission control driving circuit outputs the (n−1)-th stage emission control signal EM(n−1).

A source and a drain of the tenth transistor T10 are electrically connected between the first clock line XCK and the fourth node D and between a gate of the tenth transistor T10 and the fifth node E.

One of a source and a drain of the eleventh transistor T11 is electrically connected to a second power supply line VGH, and one of a source and a drain of the twelfth transistor T12 is electrically connected to the fifth Node E. The other one of the source and the drain of the eleventh transistor T11 is electrically connected to the other one of the source and the drain of the twelfth transistor T12. A gate of the eleventh transistor T11 is electrically connected to the fourth node D, and a gate of the twelfth transistor T12 is electrically connected to the second clock line CK. A voltage transmitted by the second power line VGH is 6V-8V.

A source and a drain of the thirteenth transistor T13 are electrically connected between the second clock line CK and a sixth node F, and a gate of the thirteenth transistor T13 is electrically connected to the fourth node D.

A source and a drain of the fourteenth transistor T14 are electrically connected between the sixth node F and a seventh node G, and a gate of the fourteenth transistor T14 is electrically connected to the second clock line CK.

determining the corresponding sub-pixels in the boundary area that are repeatedly processed by the interpolation method; and averaging the grayscales of the corresponding sub-pixels repeatedly processed by the interpolation method.

A source and a drain of the fifteenth transistor T15 are electrically connected between the second power line VGH and a seventh node G, and a gate of the fifteenth transistor T15 is electrically connected to the fifth Node E.

A source and a drain of the sixteenth transistor T16 are electrically connected to the second power line VGH and the output end of the emission control driving circuit, and a gate of the sixteenth transistor T16 is electrically connected to the seventh node G.

A source and a drain of the seventeenth transistor T17 are electrically connected to the first power supply line VGL and the output end of the emission control driving circuit, and a gate of the seventeenth transistor T17 is electrically connected to the fifth node E. The output end of the n-th stage emission control driving circuit outputs the n-th stage emission control signal EM(n), and is electrically connected to the corresponding third gate line SL3. The sixteenth transistor T16 is used to cause the emission control driving circuit to output a high level, and the seventeenth transistor T17 is used to cause the emission control driving circuit to output a low level.

The first capacitor C1 is connected in series between the fourth node D and the sixth node F. The second capacitor C2 is connected in series with the gate of the sixteenth transistor T16 and one of the source and the drain of the sixteenth transistor T16 that is electrically connected to the second power line VGH. The third capacitor C3 is connected in series between the second clock line CK and the fifth node E.

Please continue to refer to FIGS. 3A to 3B, which illustrate the working principle by taking as an example that the n-th stage emission control driving circuit is described, and the eighth transistor T8 to the seventeenth transistor T17 are all P-type transistors.

In a first phase t1, the signal transmitted by the first clock line XCK is in a low level state, the signal transmitted by the second clock line CK is in a high-level state, and the (n−1)-th stage emission control signal EM(n−1) output by the (n−1)-th stage emission control driving circuit provides an input signal for the n-th stage emission control driving circuit (wherein, if n is 1, it represents the first stage emission control driving circuit, and then the transmission start signal EM-STV transmitted by the transmission start signal line serves as the input signal). Moreover, the eighth transistor T8 and the ninth transistor T9 are turned on, a potential of the fourth node D is set to the low level state, and a potential of the fifth node E is set to the high level state, a potential of the sixth node F is in the high level state, a potential of the seventh node G is in the high level state, the sixteenth transistor T16 and the seventeenth transistor T17 are both turned off, and the output signal EM(n) of the n-th stage emission control driving circuit maintains a low potential state of the previous stage.

In the second phase t2, the signal transmitted by the first clock line XCK is in the high level state, the signal transmitted by the second clock line CK is in the low level state, and the twelfth transistor T12 and the fourteenth transistor T14 are turned on. Due to a coupling effect of the capacitor C1, the potential at the fourth node D continues to decrease. The eleventh transistor T11 and the thirteenth transistor T13 are turned on, the potential at the fifth node E continues to maintain the high level state, the potential at the seventh node G is in the low level state, and the sixteenth transistor T16 is turned on. The output signal EM(n) of the n-th stage emission control driving circuit is in the high level state, which causes a waveform to shift with respect to the output signal EM(n−1) of the (n−1)-th stage emission control driving circuit.

In a third phase t3, the signal transmitted by the first clock line XCK is in the low level state, the signal transmitted by the second clock line CK is in the high level state, the ninth transistor T9 is turned on, and the potential of the fifth node E continues to maintain the high level state. The fourteenth transistor T14, the fifteenth transistor T15, and the seventeenth transistor T17 are all turned off. The second capacitor C2 maintains the potential at the seventh node G to maintain the low level state of the previous stage. The sixteenth transistor T16 is turned on, and the output signal EM(n) of the n-th stage emission control driving circuit is still in the high level state.

In a fourth phase t4, the signal transmitted by the first clock line XCK is in the high level state, and the signal transmitted by the second clock line CK is in the low level state. Similar to the working principle of the second phase t2, the potential at the fifth node E continues to maintain the high level state, the potential at the seventh node G is in the low level state, the sixteenth transistor T16 is turned on, and the output signal EM(n) of the n-th stage emission control driving circuit is still in the high level state.

In a fifth phase t5, the signal transmitted by the first clock line XCK is in the low level state, the signal transmitted by the second clock line CK is in the high level state, the ninth transistor T9 is turned on, and the (n−1)-th stage emission control signal EM(n−1) output by the (n−1)-th stage emission control driving circuit provides an input signal for the n-th stage emission control driving circuit. The potential at the fifth node E is decreased, and the seventeenth transistor T17 is turned on. When the potential of the output end of the n-th stage emission control driving circuit is lowered to L+2Vth, the seventeenth transistor T17 is turned off. L represents a voltage output by the first power line VGL.

In a sixth phase t6, the signal transmitted by the first clock line XCK is in the high level state, the signal transmitted by the second clock line CK is in the low level state, and the potential at the fifth node E is decreased due to the coupling effect of the third capacitor C3. The seventeenth transistor T17 is turned on, and the output signal EM(n) of the output end of the n-th stage emission control driving circuit is in the low level state. Next, the output signal EM(n) of the output end of the n-th stage emission control driving circuit serves as the input signal of the (n+1)-th stage emission control driving circuit, thereby realizing the cascaded transmission function.

Please continue to refer to FIG. 1. The driving chip DIC is electrically connected to the processing chip 200 of the display device and the emission control driving circuits 300. The driving chip DIC is used to transmit the emission start signal EM-STV1 to the emission control driving circuits 300. Pulse widths of multiple first pulses, which are corresponding to multiple non-display phases in one frame period, in the emission start signal EM-STV1 are at least partially different. Therefore, pulse widths of pulses, corresponding to the non-display phases, in the emission control signals EM output by the cascaded emission control driving circuits 300 are also at least partially different. When the pixel driving circuits control the light-emitting devices PE to realize display operations according to the emission control signals EM, a display duration of each display phase is adjusted, so that the display brightness of each light-emitting device PE can be adjusted in one frame period, thus improving a flickering problem.

It can be understood that the non-display phases are phases in which the light-emitting device PE does not emit light. That is to say, the non-display phase includes an initialization phase Pt1 and a data writing and compensation phase Pt2. Specifically, taking an example in which the first transistor T1 to the seventh transistor T7 in each of the pixel driving circuits are all P-type transistors, the first pulses corresponding to the non-display stages in the initial emission start signal EM-STV0 are in the high level state. Accordingly, the pulses corresponding to the non-display phases in each emission control signal EM is in the high level state, so that the fifth transistor T5 and the sixth transistor T6 in each of the pixel driving circuits are turned off, and as a result, the light-emitting device PE does not emit light.

Optionally, the emission start signal EM-STV1 can be obtained by compensate the pulse widths of the pulses of the first pulses corresponding the non-display stages in one frame period in the initial emission start signal EM-STV0 according to the multiple pulse width compensation values H.

Figure 4:
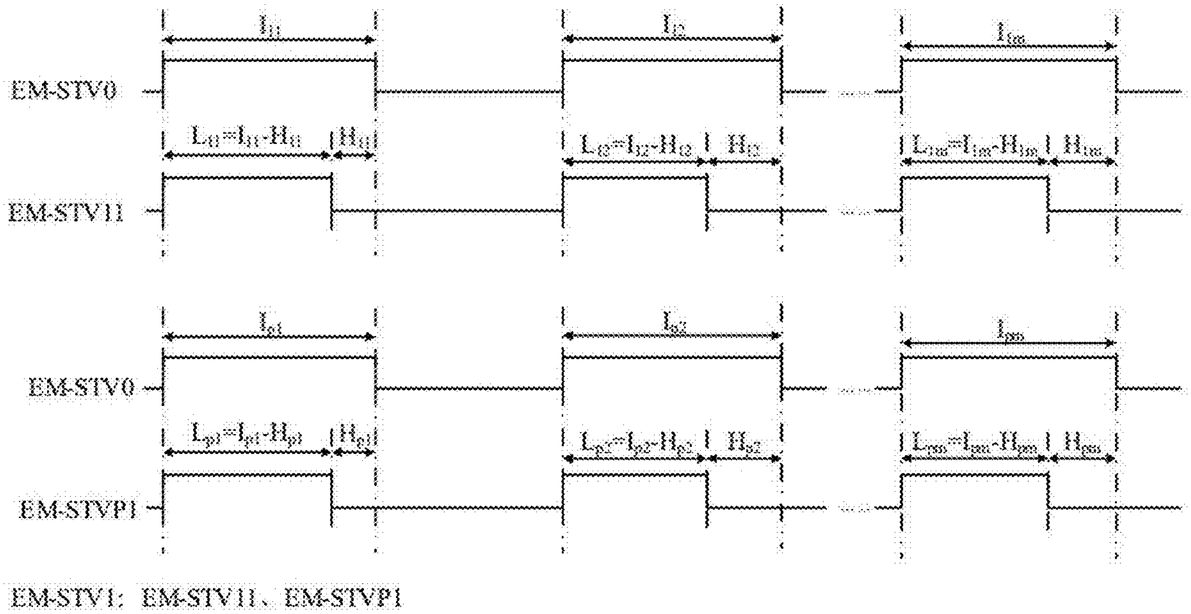
FIG. 4 is a timing diagram of an initial transmission start signal and a compensated transmission start signal according to one embodiment of the present application.

Specifically, please continue to refer to FIG. 4, which is a timing diagram of the initial transmission start signal and compensated transmission start signal according to one embodiment of the present application. Within one frame period, each of the first pulses included in the initial transmission start signal EM-STVO has a first initial pulse width I. By compensating the first initial pulse widths I according to the pulse width compensation values H, the compensated transmission start signal EM-STV1 is obtained, so that the first pulses corresponding to the non-display phases included in the compensated emission start signal EM-STV1 in one frame period are made to have a second pulse width L. Then, through the driving chip DIC, the compensated emission start signal EM-STV1 serves as the input signal of the first emission control driving circuit in the multiple cascaded emission control driving circuits 300. Accordingly, the multiple cascaded emission control driving circuits 300 output multiple emission control signals, so as to adjust light-emitting durations of the light-emitting devices PE in the display stages within one frame period according to the emission control signals. As a result, the present application realizes the adjustment of the brightness variation ranges of the multiple light-emitting devices PE within one frame period, which can compensate for the flickering problem caused by the attenuation of the light-emitting brightness of the light-emitting device PE due to great current leakage of the transistors when low-temperature polysilicon transistors are used for all transistors in the pixel driving circuit. In addition, the present application can also improve a brightness difference between different frequencies that occurs when the display panel is displayed with a dynamic refresh rate.

Further, a description is given below by taking as an example that one frame period includes m non-display phases. Correspondingly, there are m pulse width compensation values: $H_{11}$, $H_{12}$, $H_{13}$, . . . , and $H_{1m}$. The initial transmission start signal EM-STV0 includes m first pulses. The first initial pulse widths of the m first pulses included in the initial transmission start signal EM-STV0 are: $I_{11}$, $I_{12}$, . . . , and $I_{1m}$. By compensating the m first initial pulse widths according to the m pulse width compensation values, it is obtained that the first pulses of the compensated emission start signal EM-STV1, corresponding to the non-display phases, include the second pulse widths: $L_{11}$, $L_{12}$, . . . , and $L_{1m}$.

Optionally, the second pulse width L is equal to a difference between the first initial pulse width I and the corresponding pulse width compensation value H. That is to say, the second pulse widths of the m first pulses included in the emission start signal EM-STV1 after compensation are: $L_{11}=I_{11}-H_{11}$, $L_{12}=I_{12}-H_{12}$, . . . , and $L_{1m}=I_{1m}-H_{1m}$.

Optionally, the pulse width compensation values H are at least partially unequal. That is to say, the m pulse width compensation values $H_{11}$, $H_{12}$, . . . , and $H_{1m}$ are at least partially unequal, so as to adjust the display duration of the light-emitting device PE in multiple display phases.

Optionally, the second pulse widths L of the first pulses corresponding to the non-display phases within one frame period in the compensated emission start signal EM-STV1 are at least partially different. That is to say, the m second pulse widths, $L_{11}$, $L_{12}$, . . . , and $L_{1m}$, are at least partially different.

Optionally, the first initial pulse widths I are equal. That is, $I_{11}=I_{12}=I_{13}= \ldots =I_{1m}$.

The emission start signal EM-STV1 still includes m first pulses after compensation, so there are still m display phases in one frame period. As a result, the m first initial pulse widths $I_{11}$, $I_{12}$, . . . , $I_{1m}$ are greater than the m second pulse widths $L_{11}$, $L_{12}$, . . . , and $L_{1m}$. That is to say, $I_{11}>L_{11}$, $I_{12}>L_{12}$, . . . , and $I_{1m}>L_{1m}$.

The brightness attenuation of the light-emitting device PE within one frame period also varies under different duty ratios of the initial emission start signal EM-STV0. Consequently, by setting different pulse width compensation values H, the brightness compensation on different brightness adjustment nodes can be approximated, so as to improve the brightness difference as a result of flickering and due to switching between different refresh frequencies. Specifically, within one frame period, the brightness of the display panel in a brightness adjustment interval corresponding to the initial emission start signal EM-STVO is proportional to a sum of the pulse width compensation values. For example, within one frame period, the display panel has a first brightness in a first brightness adjustment interval corresponding to the initial emission start signal EM-STV0, and the compensated emission start signal EM-STV1 is obtained by compensating the pulse widths of the first pulses corresponding to multiple non-display phases in one frame period in the initial emission start signal EM-STV0 according to first pulse width compensation values $H_{11}$, $H_{12}$, . . . , and $H_{1m}$. In another frame period, the display panel has a second brightness in the second brightness adjustment interval corresponding to the initial emission start signal EM-STV0, and the compensated emission start signal EM-STV1 is obtained by compensating the pulse widths of the first pulses corresponding to multiple non-display phases in one frame period in the initial emission start signal EM-STV0 according to second pulse width compensation values $H_{21}$, $H_{22}$, . . . , and $H_{2m}$. Then, the first brightness is greater than the second brightness, and a sum of the multiple first pulse width compensation values $H_{11}$, $H_{12}$, . . . , and $H_{1m}$ is greater than a sum of the multiple second pulse width compensation values $H_{21}$, $H_{22}$, . . . , and $H_{2m}$. That is to say, $H_{11}+H_{12}+ \ldots +H_{1m}>H_{21}+H_{22}+ \ldots +H_{2m}$.

Temperatures will affect the current leakage of the transistors and result in different display brightness attenuation degrees within one frame period. Therefore, the initial emission start signal EM-STV0 can be compensated according to different temperatures, so as to achieve the approximation of the brightness compensation at different temperatures, alleviate flickering, and reduce brightness differences between different frequencies. Specifically, the sum of the pulse width compensation values H within one frame period is proportional to an operating temperature of the display panel. For example, within one frame period, the display panel has a first operating temperature, and the compensated emission start signal EM-STV1 is obtained by compensating the pulse widths of the first pulses corresponding to the non-display phases in the initial emission start signal EM-STV0 according to the third pulse width compensation values $H_{31}$, $H_{32}$, . . . , and $H_{3m}$. In another frame period, the display panel has a second operating temperature, and the compensated emission start signal is obtained by compensating the pulse widths of the multiple first pulses corresponding to the multiple non-display phases in one frame period in the initial emission start signal EM-STV0 according to the fourth pulse width compensation values $H_{41}$, $H_{42}$, . . . , and $H_{4m}$. The first operating temperature is greater than the second operating temperature. A sum of the third pulse width compensation values $H_{31}$, $H_{32}$, . . . , and $H_{3m}$ is greater than the sum of the fourth pulse width compensation values $H_{41}$, $H_{42}$, . . . , and $H_{4m}$. That is to say, $H_{31}+H_{32}+ \ldots +H_{3m}>H_{41}+H_{42}+ \ldots +H_{4m}$.

As shown in FIG. 4, EM-STV11 represents the emission start signal obtained by compensation according to the brightness adjustment interval. EM-STVp1 represents the emission start signal obtained by compensation according to the operating temperature. It can be understood that in addition to the compensated emission start signal EM-STV1 obtained according to the brightness adjustment interval and the operating temperature, the initial emission start signal EM-STV0 can also be compensated according to other parameters to obtain the compensated emission start signal EM-STV1. The compensated emission start signals EM-STV1 obtained according to the brightness adjustment interval and the operating temperature can have different waveforms. That is to say, $L_{11}$, $L_{12}$, . . . , $L_{1m}$ can be not equal to $L_{p1}$, $L_{p2}$, . . . , $L_{pm}$; and $H_{11}$, $H_{12}$, . . . , $H_{1m}$ can be not equal to $H_{p1}$, $H_{p2}$, . . . , $H_{pm}$.

Optionally, the pulse width compensation values H can be stored in a memory of the display panel in advance; that is, the information shown in the following table can be stored in the memory.

| | | | | | |
|---|---|---|---|---|---|
| first initial pulse width | $I_{11}$ | $I_{12}$ | $I_{13}$ | . . . | $I_{1m}$ |
| | $I_{21}$ | $I_{22}$ | $I_{23}$ | . . . | $I_{2m}$ |
| | $I_{31}$ | $I_{32}$ | $I_{33}$ | . . . | $I_{3m}$ |
| | . . . | . . . | . . . | . . . | . . . |
| | $I_{p1}$ | $I_{p2}$ | $I_{p3}$ | . . . | $I_{pm}$ |
| pulse width compensation value | $H_{11}$ | $H_{12}$ | $H_{13}$ | . . . | $H_{1m}$ |
| | $H_{21}$ | $H_{22}$ | $H_{23}$ | . . . | $H_{2m}$ |
| | $H_{31}$ | $H_{32}$ | $H_{33}$ | . . . | $H_{3m}$ |
| | . . . | . . . | . . . | . . . | . . . |
| | $H_{p1}$ | $H_{p2}$ | $H_{p3}$ | . . . | $H_{pm}$ |
| second pulse width | $L_{11} = I_{11} - H_{11}$ | $L_{12} = I_{12} - H_{12}$ | $L_{13} = I_{13} - H_{13}$ | . . . | $L_{1m} = I_{1m} - H_{1m}$ |
| | $L_{21} = I_{21} - H_{21}$ | $L_{22} = I_{22} - H_{22}$ | $L_{23} = I_{23} - H_{23}$ | . . . | $L_{2m} = I_{2m} - H_{2m}$ |
| | $L_{31} = I_{31} - H_{31}$ | $L_{32} = I_{32} - H_{32}$ | $L_{33} = I_{33} - H_{33}$ | . . . | $L_{3m} = I_{3m} - H_{3m}$ |
| | . . . | . . . | . . . | . . . | . . . |
| | $L_{p1} = I_{p1} - H_{p1}$ | $L_{p2} = I_{p2} - H_{p2}$ | $L_{p3} = I_{p3} - H_{p3}$ | . . . | $L_{pm} = I_{pm} - H_{pm}$ |

FIGS. 5A to 5E are a process flow diagram of a display control method according to one embodiment of the present application. Please continue to refer to FIGS. 4 and FIGS. 5A to 5E. The present application provides a display control method for a display panel, including: the driving chip DIC transmits the compensated emission start signal EM-STV1 to the emission control driving circuit 300.

The compensated emission start signal EM-STV1 is obtained by compensating the pulse widths of the multiple first pulses corresponding to the multiple non-display phases in one frame period in the initial emission start signal EM-STV0 according to multiple pulse width compensation values H.

Optionally, the pulse width compensation values H are at least partially unequal. Optionally, the second pulse widths L of the first pulses corresponding to the non-display phases within one frame period in the compensated emission start signal EM-STV1 are at least partially different.

Figure 5A:
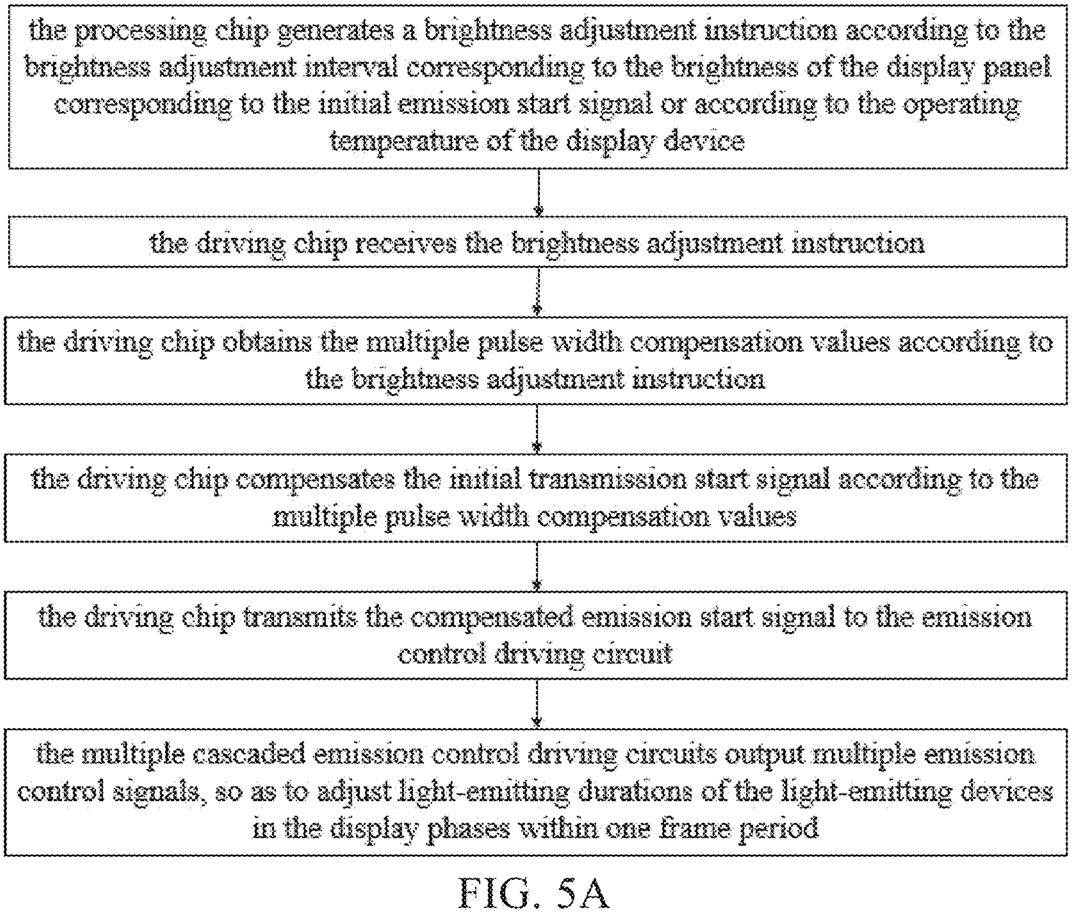
FIGS. 5A to 5E are process flow diagrams of a display control method according to one embodiment of the present application.
Figure 5B:
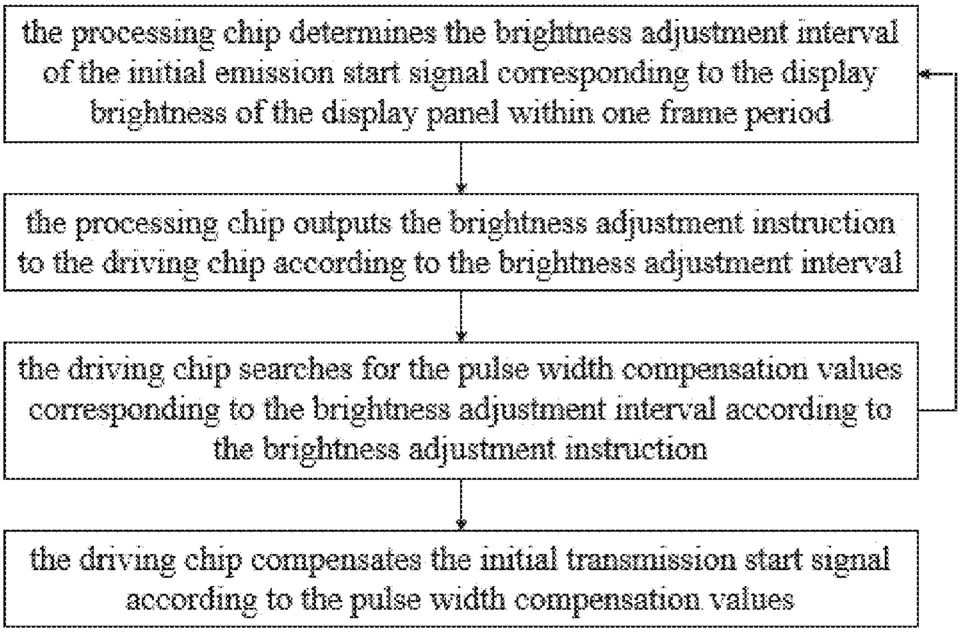

Please continue to refer to FIGS. 5A to 5B. Before the step of the driving chip DIC transmitting the compensated emission start signal EM-STV1 to the emission control driving circuit 300, the display control method further includes: the driving chip DIC receives a brightness adjustment instruction; the driving chip DIC obtains the pulse width compensation values H according to the brightness adjustment instruction; and the driving chip DIC compensates the initial transmission start signal EM-STV0 according to the pulse width compensation values H.

The brightness adjustment instruction is generated by the processing chip according to the brightness adjustment interval corresponding to the brightness of the display panel corresponding to the initial emission start signal EM-STV0 or is generated by the processing chip according to the operating temperature of the display device.

Please continue to refer to FIG. 5B. When to compensate the initial emission start signal EM-STV0 according to the brightness adjustment interval of the initial emission start signal EM-STV0 corresponding to the brightness of the display panel, the processing chip can first determine the brightness adjustment interval of the initial emission start signal EM-STV0 corresponding to the display brightness of the display panel within one frame period. Then, the processing chip outputs a brightness adjustment instruction to the driving chip DIC according to the brightness adjustment interval, and the driving chip DIC searches according to the brightness adjustment instruction the pulse width compensation values H corresponding to the brightness adjustment interval stored in the memory to compensate the initial emission start signal EM-STV0. Since a display process of the display panel includes multiple frame periods, it can be continuously performed that the processing chip determines the brightness adjustment interval and sends the brightness adjustment instruction, and the driving chip DIC receives the brightness adjustment instruction and searches for the corresponding pulse width compensation values H. Thus, the display compensation can be made in each frame period when the display panel displays, thus reducing the brightness difference problem when switching between different refresh frequencies. The brightness of the display panel corresponding to the brightness adjustment interval is proportional to the sum of the pulse width compensation values H. That is to say, if the multiple pulse width compensation values corresponding to the brightness adjustment interval within one frame period are $H_{11}$, $H_{12}$, . . . , $H_{1m}$, the higher the brightness of the display panel corresponding to the brightness adjustment interval, the greater the sum of $H_{11}$, $H_{12}$, . . . , $H1_m$. The lower the brightness of the display panel corresponding to the brightness adjustment interval, the lesser the sum of $H_{11}$, $H1_2$, . . . , $H_{1m}$.

When to compensate the initial emission start signal EM-STV0 according to the operating temperature of the display panel, a temperature sensor can be used to detect the operating temperature of the display panel, and then the processing chip outputs multiple brightness adjustment instructions to the driving chip DIC according to the operating temperature of the display panel. The driving chip DIC then searches for multiple pulse width compensation values H corresponding to the operating temperature of the display panel stored in the memory to compensate the initial emission start signal EM-STV0. Since the display process of the display panel includes multiple frame periods, the temperature sensor can continuously detect the operating temperature of the display panel. Accordingly, it can be continuously performed that the processing chip sends the brightness adjustment instruction according to the operating temperature of the display panel, and the driving chip DIC receives the brightness adjustment instruction and searches for the corresponding pulse width compensation values H. Thus, the display compensation can be made in each frame period when the display panel displays, thereby reducing the brightness difference when switching between different frequencies. The operating temperature is proportional to the sum of the pulse width compensation values H. That is, if the multiple pulse width compensation values corresponding to the operating temperature in one frame period are $H_{p1}$, $H_{p2}$, . . . , $H_{pm}$, the higher the operating temperature, the greater the current leakage of the transistor, and the greater the sum of $H_{p1}$, $H_{p2}$, . . . , $H_{pm}$. The lower the operating temperature, the lesser the current leakage of the transistor, and the lesser the sum of $H_{p1}$, $H_{p2}$, . . . , $H_{pm}$.

Figure 5C:
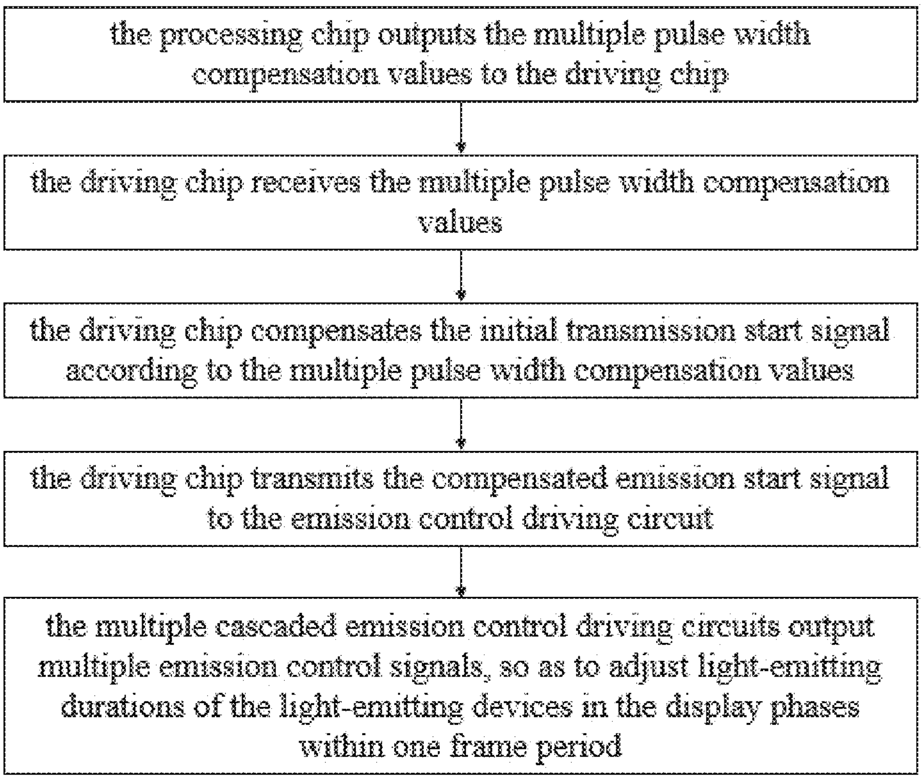
Figure 5D:
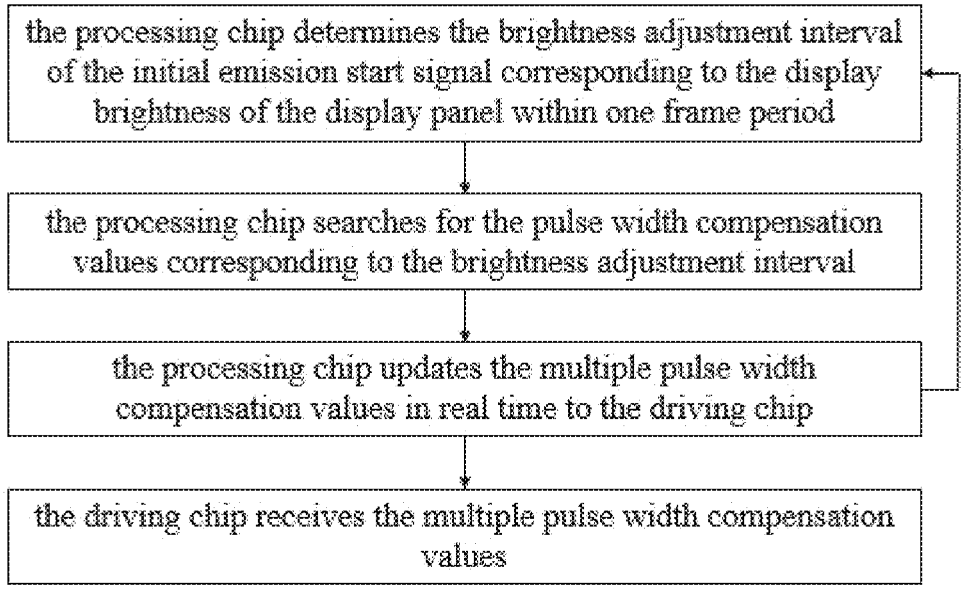
Figure 5E:
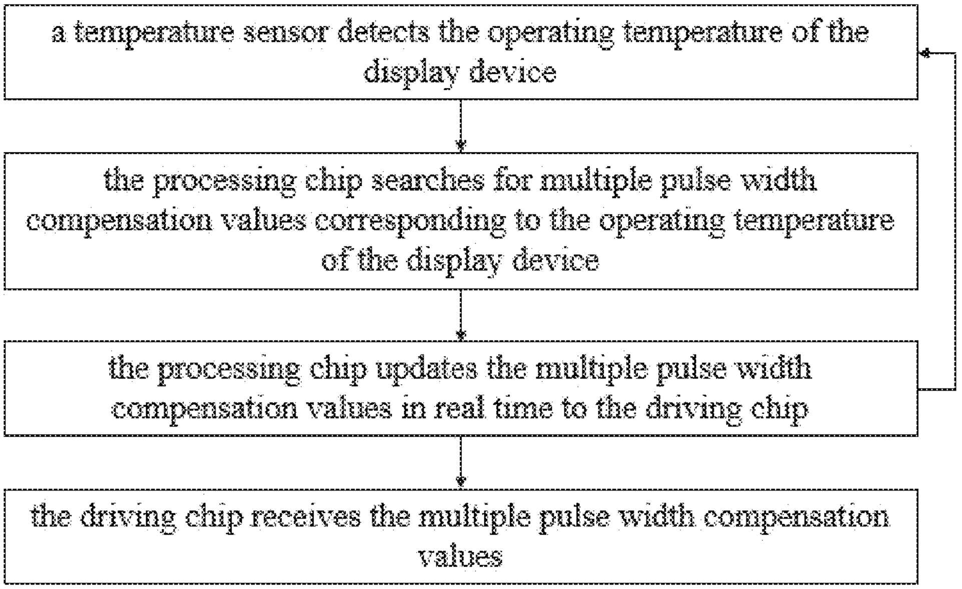

Please continue to refer to FIGS. 5C to 5E. Before the step of the driving chip DIC transmitting the compensated emission start signal EM-STV1 to the emission control driving circuit 300, the display control method further includes: The driving chip DIC receives the multiple pulse width compensation values H. The pulse width compensation values H are obtained by the processing chip according to the brightness adjustment interval corresponding to the brightness of the display panel corresponding to the initial emission start signal EM-STV0 or obtained by the processing ship according to the operating temperature of the display panel.

Specifically, as shown in FIG. 5D, the processing chip determines the brightness adjustment interval of the initial emission start signal EM-STV0 corresponding to the display brightness of the display panel within one frame period, and then the processing chip searches for the multiple pulse width compensation values H which are corresponding to the brightness adjustment interval and stored in the memory. After that, the processing chip updates the multiple pulse width compensation values H to the driving chip DIC in real time. It can be continuous performed that the processing chip determines the brightness adjustment interval, searches for the pulse width compensation values H according to the brightness adjustment interval, and updates the pulse width compensation values H in real time to the driving chip DIC.

Specifically, as shown in FIG. 5E, the temperature sensor detects the operating temperature of the display panel, and then the processing chip searches for the pulse width compensation values H which are corresponding to the operating temperature of the display panel and stored in the memory according to the operating temperature of the display panel. After that, the processing chip updates the multiple pulse width compensation values H to the driving chip DIC in real time. It can be continuously performed that the temperature sensor detects the operating temperature, and the processing chip searches for multiple pulse width compensation values H according to the operating temperature and updates the multiple pulse width compensation values H in real time to the driving chip DIC. It can be understood that the temperature sensor is turned on when the display device is turned on for operation.

Figure 6:
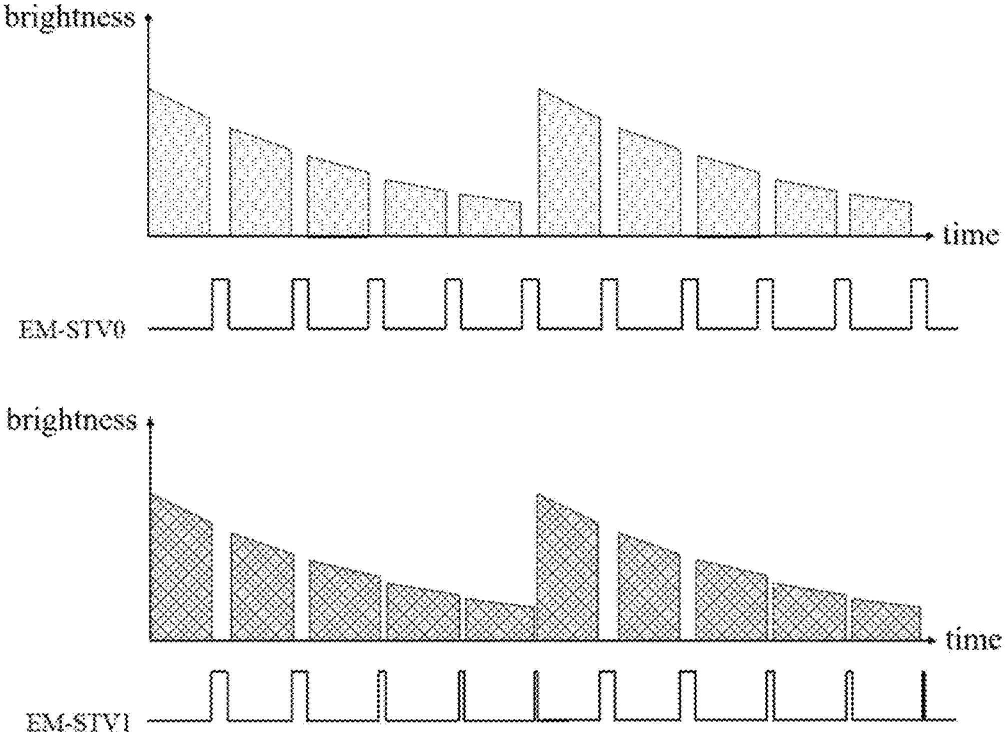
FIG. 6 is a schematic diagram illustrating brightness compensation in one frame period according to one embodiment of the present application.

FIG. 6 is a schematic diagram of brightness compensation in one frame period according to one embodiment of the present application. The pulse widths of the first pulses of the compensated emission start signal EM-STV1 are at least partially different, so that brightness changes (the brightness conversion within each display phase is an integral of current over time) perceived by the human eyes are similar in multiple display phases within one frame period, thereby improving flickering. Particularly, active layers of the third transistor T3 and the fourth transistor T4 in each pixel driving circuit include polysilicon. Moreover, when the display panel uses a low refresh frequency for display, the gate voltage of the first transistor T1 changes greatly as a result of the current leakage of the third transistor T3 and the fourth transistor T4, resulting in a large change in the current flowing through the light-emitting device PE. Consequently, there is a large difference in brightness between the beginning and the end of one frame period, causing flickering problems. In the present application, by compensating the initial emission start signal EM-STV0 according to the pulse width compensation values H, the brightness conversion (i.e., the integral of the current over time) of the compensated emission start signal EM-STV1 in each display phase is similar, which can improve the flickering problem caused by the current leakage of the third transistor T3 and the fourth transistor T4 when the display panel displays at a low refresh frequency.

The present application also provides a display module including any of the above-mentioned display panels.

The present application also provides a display device, including any of the above-mentioned display panels, any of the above-mentioned display modules, and a display panel or a display module that utilizes the above-mentioned display panel control method to realize display operations of the display panel. Further, the display device further includes a processing chip, and the processing chip is electrically connected to the memory and the driving chip, so as to realize a display control on the display panel through the processing chip, the driving chip, and the memory.

It can be understood that the display device includes a portable display device (such as a notebook computer, a mobile phone, etc.), a fixed terminal (such as a desktop computer, a television, etc.), a measurement device (such as a sports bracelet, a thermometer, etc.), and the like.

Specific examples are used herein to illustrate working principles and embodiments of the present application. The descriptions of the above embodiments are only used for ease of understanding the method and main ideas of the present application, and the disclosure should not be construed as limitations to the present application.

What is claimed is:

1. A display control method of a display panel, comprising the following step:

providing a plurality of cascaded emission control driving circuits to output a plurality of emission control signals according to an emission start signal;

controlling, by a plurality of pixel driving circuits, a plurality of light-emitting devices to emit light according to the plurality of emission control signals; and transmitting a compensated emission start signal to the emission control driving circuits, wherein one frame period includes a plurality of display phases in which the light-emitting devices emit light and a plurality of non-display phases in which the light-emitting devices are turned off;

generating a compensated emission start signal by modifying pulse widths of a plurality of pulses respectively corresponding to the plurality of non-display phases, wherein the modifying adjusts emission durations of the display phases within the one frame period and is performed according to pulse-width compensation values respectively corresponding to the plurality of non-display phases and determined to offset a luminance variation occurring within the one frame period due to electrical leakage of the pixel driving circuits during the non-display phases; and transmitting the compensated emission start signal to the cascaded emission control driving circuits so that emission durations of the display phases are adjusted to offset the luminance variation, wherein the pulse-width compensation values applied to at least some of the non-display phases within one frame period are different from one another.

2. The display control method according to claim 1, wherein the pulse widths of the first pulses respectively corresponding to the non-display phases in one frame period in the compensated emission start signal are at least partially different.

3. The display control method according to claim 1, wherein each of the first pulses respectively corresponding to the non-display phases in one frame period in the initial emission start signal has a first initial pulse width;

each of the first pulses respectively corresponding to the non-display phases in one frame period in the compensated emission start signal has a second pulse width; and the second pulse width is equal to a difference between the first initial pulse width and a corresponding one of the pulse width compensation values.

4. The display control method according to claim 1, wherein before the step of transmitting the compensated emission start signal to the emission control driving circuit, the display control method further comprises:

receiving a brightness adjustment instruction, wherein the brightness adjustment instruction is generated according to a brightness adjustment interval corresponding to a brightness of the display panel corresponding to the initial emission start signal or is generated by a processing chip according to an operating temperature of the display panel;

obtaining the pulse width compensation values according to the brightness adjustment instruction; and compensating the initial emission start signal according to the pulse width compensation values.

5. The display control method according to claim 4, wherein the brightness of the display panel corresponding to the brightness adjustment interval is proportional to a sum of the pulse width compensation values.

6. The display control method according to claim 4, wherein the operating temperature is proportional to a sum of the pulse width compensation values.

7. The display control method according to claim 1, wherein before the step of transmitting the compensated emission start signal to the emission control driving circuit, the display control method further comprises:

receiving the pulse width compensation values, wherein the pulse width compensation values are obtained according to a brightness adjustment interval corresponding to a brightness of the display panel corresponding to the initial emission start signal or obtained by a processing chip according to an operating temperature of the display panel.

8. A display module, comprising a display panel, wherein the display panel comprises:

a plurality of light-emitting devices;

a plurality of cascaded emission control driving circuits for outputting a plurality of emission control signals according to an emission start signal;

a plurality of pixel driving circuits electrically connected to the light-emitting devices and the emission control driving circuits, wherein the pixel driving circuits control the light-emitting devices to emit light according to the emission control signals; and a driving chip electrically connected to a processing chip of a display device and to the emission control driving circuits, wherein the driving chip transmits the emission start signal to the emission control driving circuits, wherein, during operation of the display panel, one frame period includes display phases in which the light-emitting devices emit light and non-display phases in which the light-emitting devices are turned off;

wherein the driving chip is configured to generate a compensated emission start signal by modifying pulse widths of a plurality of pulses respectively corresponding to the plurality of non-display phases, wherein the modifying adjusts emission durations of the display phases within the one frame period and is performed according to pulse-width compensation values respectively corresponding to the plurality of non-display phases and determined to offset a luminance variation occurring within the one frame period due to electrical leakage of the pixel driving circuits during the non-display phases;

wherein the pulse-width compensation values applied to at least some of the non-display phases within the one frame period are different from one another.

9. The display module according to claim 8, wherein each of the multiple first pulses respectively corresponding to the non-display phases in one frame period in the initial emission start signal has a first initial pulse width;

each of the first pulses respectively corresponding to the non-display phases in one frame period in the emission start signal has a second pulse width; and wherein the second pulse width is equal to a difference between the first initial pulse width and a corresponding one of the pulse width compensation values.

10. The display module according to claim 9, wherein each of the first initial pulse widths is greater than the corresponding second pulse width.

11. The display module according to claim 8, wherein in one frame period, the display panel has a first brightness corresponding to a first brightness adjustment interval corresponding to the initial emission start signal, and the emission start signal is obtained by compensating the pulse widths of the first pulses respectively corresponding to the non-display phases in one frame period according to multiple first pulse width compensation values; and in another frame period, the display panel has a second brightness corresponding to a second brightness adjustment interval corresponding to the initial emission start signal, and the emission start signal is obtained by compensating the pulse widths of the first pulses respectively corresponding to the non-display phases in one frame period according to multiple second pulse width compensation values;

wherein the first brightness is greater than the second brightness, and a sum of the multiple first pulse width compensation values is greater than a sum of the multiple second pulse width compensation values.

12. The display module according to claim 8, wherein in one frame period, the display panel has a first operating temperature, and the emission start signal is obtained by compensating the pulse widths of the first pulses respectively corresponding to the non-display phases in one frame period in the initial emission start signal according to multiple third pulse width compensation values; and in another frame period, the display panel has a second operating temperature, and the emission start signal is obtained by compensating the pulse widths of the first pulses respectively corresponding to the non-display phases in one frame period in the initial emission start signal according to multiple fourth pulse width compensation values;

wherein the first operating temperature is greater than the second operating temperature, and a sum of the third pulse width compensation values is greater than a sum of the fourth pulse width compensation values.

13. The display module according to claim 8, wherein each of the pixel driving circuits comprises a first transistor, a fifth transistor, and a sixth transistor; and a source and a drain of the first transistor, a source and a drain of the fifth transistor, a source and a drain of the sixth transistor, and the corresponding light-emitting device are connected in series between a first voltage terminal and a second voltage terminal;

wherein the cascaded emission control driving circuits are electrically connected to gates of the fifth transistors and gates of the sixth transistors in the pixel driving circuits, and the gate of the fifth transistor and the gate of the sixth transistor in the same pixel driving circuit are electrically connected to the same emission control driving circuit.

14. A display device, comprising a display module and a processing chip, wherein the display module comprises:

a display panel, wherein the display panel comprises a plurality of light-emitting devices, a plurality of cascaded emission control driving circuits, a plurality of pixel driving circuits, and a driving chip; the cascaded emission control driving circuits output a plurality of emission control signals according to an emission start signal; the pixel driving circuits are electrically connected to the light-emitting devices and the emission control driving circuits, and the pixel driving circuits control the light-emitting devices to emit light according to the emission control signals; and the driving chip is electrically connected to the processing chip and the emission control driving circuits for transmitting the emission start signal to the emission control driving circuits, wherein, during operation of the display panel, one frame period includes display phases in which the light-emitting devices emit light and non-display phases in which the light-emitting devices are turned off;

wherein the driving chip is configured to generate a compensated emission start signal by modifying pulse widths of a plurality of pulses respectively corresponding to the plurality of non-display phases, wherein the modifying adjusts emission durations of the display phases within the one frame period and is performed according to pulse-width compensation values respectively corresponding to the plurality of non-display phases and determined to offset a luminance variation occurring within the one frame period due to electrical leakage of the pixel driving circuits during the non-display phases;

wherein the pulse-width compensation values applied to at least some of the non-display phases within the one frame period are different from one another.

15. The display device according to claim 14, wherein in one frame period, the display panel has a first brightness corresponding to a first brightness adjustment interval corresponding to the initial emission start signal, and the emission start signal is obtained by compensating the pulse widths of the first pulses respectively corresponding to the non-display phases in one frame period according to multiple first pulse width compensation values; and in another frame period, the display panel has a second brightness corresponding to a second brightness adjustment interval corresponding to the initial emission start signal, and the emission start signal is obtained by compensating the pulse widths of the first pulses respectively corresponding to the non-display phases in one frame period according to multiple second pulse width compensation values;

wherein the first brightness is greater than the second brightness, and a sum of the multiple first pulse width compensation values is greater than a sum of the multiple second pulse width compensation values.

16. The display device according to claim 14, wherein in one frame period, the display panel has a first operating temperature, and the emission start signal is obtained by compensating the pulse widths of the first pulses respectively corresponding to the non-display phases in one frame period in the initial emission start signal according to multiple third pulse width compensation values; and in another frame period, the display panel has a second operating temperature, and the emission start signal is obtained by compensating the pulse widths of the first pulses respectively corresponding to the non-display phases in one frame period in the initial emission start signal according to multiple fourth pulse width compensation values;

wherein the first operating temperature is greater than the second operating temperature, and a sum of the third pulse width compensation values is greater than a sum of the fourth pulse width compensation values.

17. The display device according to claim 14, wherein each of the pixel driving circuits comprises a first transistor, a fifth transistor, and a sixth transistor; and a source and a drain of the first transistor, a source and a drain of the fifth transistor, a source and a drain of the sixth transistor, and the corresponding light-emitting device are connected in series between a first voltage terminal and a second voltage terminal;

wherein the cascaded emission control driving circuits are electrically connected to gates of the fifth transistors and gates of the sixth transistors in the pixel driving circuits, and the gate of the fifth transistor and the gate of the sixth transistor in the same pixel driving circuit are electrically connected to the same emission control driving circuit.

* * * * *